United States Patent
Galinski, III

(10) Patent No.: US 7,145,316 B1
(45) Date of Patent: Dec. 5, 2006

(54) CONTROL CIRCUIT FOR MONITORING AND MAINTAINING A BOOTSTRAP VOLTAGE IN AN N-CHANNEL BUCK REGULATOR

(75) Inventor: Martin F. Galinski, III, Santa Clara, CA (US)

(73) Assignee: Micrel, Inc., San Jose, CA (US)

( * ) Notice: Subject to any disclaimer, the term of this patent is extended or adjusted under 35 U.S.C. 154(b) by 4 days.

(21) Appl. No.: 11/146,573

(22) Filed: Jun. 6, 2005

(51) Int. Cl.
*G05F 1/613* (2006.01)
*G05F 1/40* (2006.01)

(52) U.S. Cl. .................. 323/288; 323/224; 323/283
(58) Field of Classification Search ............... 323/283, 323/224, 288, 293; 327/589
See application file for complete search history.

(56) References Cited

U.S. PATENT DOCUMENTS 5,943,227 A * 8/1999 Bryson et al. ............... 363/95
7,026,801 B1 * 4/2006 Fowler et al. ............... 323/271

* cited by examiner

*Primary Examiner*—Shawn Riley
(74) *Attorney, Agent, or Firm*—Patent Law Group LLP; Carmen C. Cook

(57) ABSTRACT

A control circuit is incorporated in a switching regulator for monitoring and maintaining a bootstrap voltage to allow the switching regulator to operate at or near 100% duty cycle. The control circuit includes a circuit receiving the bootstrap voltage and generating a monitor voltage, a comparator circuit receiving the monitor voltage and a first voltage indicative of a switching output voltage and generating an output signal having a first state when the monitor voltage is equal to or less than the first voltage, a logic circuit receiving the output signal and generating drive control signals to driver circuits driving the high-side and low-side power switches. The logic circuit generates the drive control signals in response to the output signal of the comparator circuit having the first state to cause the high-side power switch to turn off and the low-side power switch to turn on, thereby recharging the bootstrap voltage.

14 Claims, 3 Drawing Sheets

CONTROL CIRCUIT FOR MONITORING AND MAINTAINING A BOOTSTRAP VOLTAGE IN AN N-CHANNEL BUCK REGULATOR

FIELD OF THE INVENTION

The invention relates to switching regulators and, in particular, to a buck switching regulator including bootstrap voltage monitoring to achieve very high duty cycles.

DESCRIPTION OF THE RELATED ART

A switching regulator, also referred to as a switching mode power supply, provides power supply function through low loss components such as capacitors, inductors, and transformers, and power switches that are turned on and off to transfer energy from the input to the output in discrete packets. A feedback control circuit is used to regulate the energy transfer to maintain a constant output voltage within certain load limits of the circuit. A switching regulator can be configured to step up the input voltage or step down the input voltage or both. Specifically, a buck switching regulator steps down the input voltage while a boost switching regulator steps up the input voltage. A buck-boost switching regulator provides both step-up and step-down functions.

In many applications, a buck switching regulator is used to convert a DC input voltage to a regulated DC output voltage being near or lower than the input voltage. In general, a buck switching regulator includes a pair of power switches—a high-side switch and a low-side switch—to perform the switching functions. The power switches generate a switching output voltage ($V_{SW}$) which is coupled to an inductor-capacitor (LC) network for filtering the switching output voltage to generate a relatively constant DC output voltage $V_{OUT}$. Specifically, the high-side switch and the low-side switch are turned on alternately to increase or decrease the inductor current through the inductor. The capacitor of the LC network filters the output voltage to reduce ripples. The regulated output voltage $V_{OUT}$ at the LC network is coupled back to the switching regulator for forming a feedback control loop to regulate the output voltage to a desired value. FIG. 1 is an exemplary circuit diagram of a buck switching regulator using N-channel transistors as the power switches. The buck switching regulator of FIG. 1 is sometimes referred to as an N-channel buck regulator.

The buck switching regulator steps down the input voltage in direct proportion to the ratio of the on-time of the high-side switch to the total switching period, referred to as the duty cycle (D). For example an ideal buck converter with a 10V input voltage operating at a duty cycle of 50% would produce an average output voltage of 5V. During regulator operation, when the load condition changes, the regulator responds accordingly to set the inductor current or the duty cycle in order to maintain the regulated output voltage.

In some operation conditions, the buck switching regulator maybe operated with the input voltage $V_{IN}$ very close to the output voltage $V_{OUT}$. For example, when the buck switching regulator is used in a battery powered system using lithium ion battery, the switching regulator may be initially regulating an input voltage of 4.2 volts for a fully charged battery down to an output voltage of 3 volts. As the battery discharges, the input voltage will decrease and the buck switching regulator may end up regulating an input voltage of nearly 3 volts to an output voltage also of 3 volts. Under this operating condition, it is desirable to operate the buck switching regulator at a high duty cycle, such as near 100%, in order to avoid an output voltage dropout condition.

However, operating at 100% duty cycle in an N-channel buck regulator is generally prohibited by the need to maintain continuous switching at the switching output (node SW in FIG. 1) to create a bootstrap voltage (voltage "BOOST" in FIG. 1). When N-channel transistors are used for both the high-side and the low-side power switches, a bootstrap voltage is generated to power the high-side driver circuit driving the high-side switch so that the N-channel high-side switch can turn on completely without using a separate higher supply voltage. In the conventional buck regulator such as that shown in FIG. 1, the bootstrap voltage ("BOOST") is generated by switching of the switching output voltage $V_{SW}$ of the switching regulator. If the duty cycle goes to 100%, there will be no switching at the switching output voltage $V_{SW}$ and the bootstrap voltage cannot be maintained. For instance, even though capacitor $C_{BST}$ (FIG. 1) is charged up to the bootstrap voltage BOOST, leakage current will cause the precharged voltage at capacitor $C_{BST}$ to decrease so that periodic refreshing of the bootstrap voltage BOOST is required. Thus, in the conventional N-channel buck regulators, a maximum limit of less than 100% is imposed on the duty cycle to ensure that the bootstrap voltage is maintained for the high-side driver circuit. For example, in most cases, the maximum duty cycle is limited to 90% for conventional N-channel buck regulators.

When the duty cycle of the switching regulator is limited to less than 100%, there is a voltage headroom between the input voltage and the regulated output voltage of the switching regulator. The voltage headroom limits the switching regulator operation when the input voltage and the output voltage are close. Because of the required voltage headroom, when the input voltage drops, the regulated output voltage may not be regulated up to the desired value. Output voltage dropout thus results.

It is desirable to provide an N-channel buck switching regulator that can be operated at or very near 100% duty cycle.

SUMMARY OF THE INVENTION

According to one embodiment of the present invention, a control circuit is incorporated in a switching regulator for monitoring and maintaining the bootstrap voltage to allow the switching regulator to operate at 100% or near 100% duty cycle.

In one embodiment, a switching regulator receives an input voltage and provides a regulated output voltage having a substantially constant magnitude. The switching regulator includes a high-side power switch and a low-side power switch connected in series between the input voltage and a first power supply voltage. The high-side power switch and the low side power switch are turned on alternately to generate a switching output voltage at a common node between the power switches which switching output voltage is used to generate the regulated output voltage. The high-side power switch is driven by a high-side driver circuit and the low-side power switch is driven by a low-side driver circuit where the high-side driver circuit is supplied by a bootstrap voltage and the switching output voltage. The control circuit in the switching regulator includes a voltage feedback and divider circuit coupled to receive the bootstrap voltage and divide the bootstrap voltage to generate a monitor voltage, a comparator circuit having a first input terminal coupled to receive the monitor voltage and a second input terminal coupled to receive a voltage indicative of the switching output voltage. The comparator circuit generates an output signal at an output terminal where the output signal has a first state when the monitor voltage is equal to or less than the voltage indicative of the switching output voltage. Finally, the control circuit further includes a logic circuit coupled to receive the output signal of the comparator circuit and generate a high-side drive control signal to the high-side driver circuit and a low-side drive control signal to the low-side driver circuit. In operation, the logic circuit generates the high-side and low-side drive control signals in response to the output signal of the comparator circuit having the first state to cause the high-side power switch to turn off and the low-side power switch to turn on, thereby recharging the bootstrap voltage to a first voltage.

According to another aspect of the present invention, a method in a switching regulator monitors the bootstrap voltage and maintains the bootstrap voltage to allow the switching regulator to operate at 100% or near 100% duty cycle.

The method can be implemented in a switching regulator receiving an input voltage and providing a regulated output voltage having a substantially constant magnitude. The switching regulator includes a high-side power switch and a low-side power switch connected in series between the input voltage and a first power supply voltage. The high-side power switch and the low side power switch is turned on alternately to generate a switching output voltage at a common node between the power switches which switching output voltage being used to generate the regulated output voltage. The high-side power switch is driven by a high-side driver circuit and the low-side power switch is driven by a low-side driver circuit where the high-side driver circuit is supplied by a bootstrap voltage and the switching output voltage. The method includes measuring the bootstrap voltage, generating a monitor voltage indicative of the bootstrap voltage, comparing the monitor voltage to a voltage indicative of the switching output voltage, generating a first signal having a first state when the monitor voltage is equal to or less than the voltage indicative of the switching output voltage, turning off the high-side power switch in response to the first signal having the first state, and turning on the low-side power switch in response to the first signal having the first state, thereby recharging the bootstrap voltage.

The present invention is better understood upon consideration of the detailed description below and the accompanying drawings.

DETAILED DESCRIPTION OF THE PREFERRED EMBODIMENTS

Figure 1:
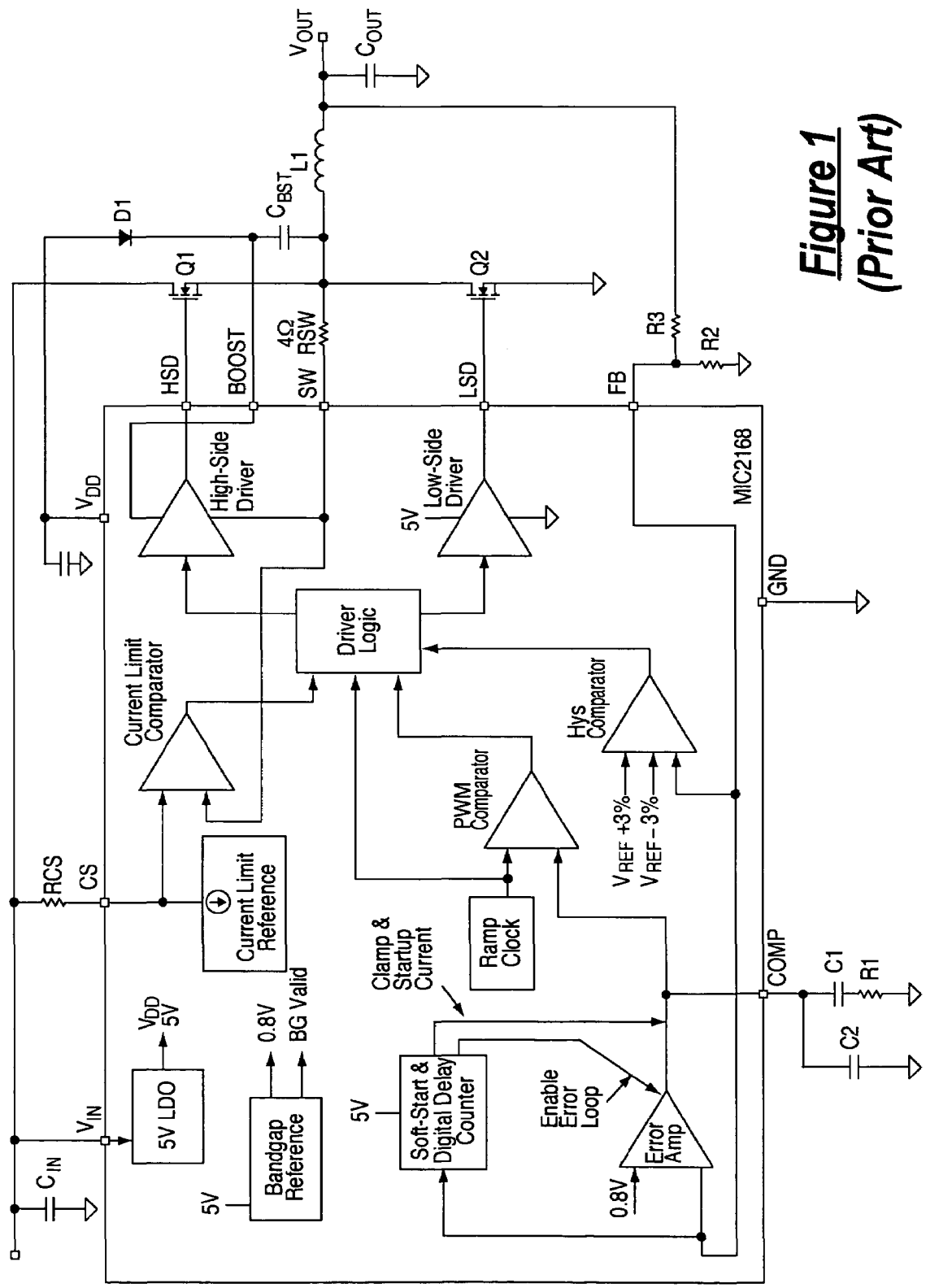
FIG. 1 is an exemplary circuit diagram of a buck switching regulator using N-channel transistors as the power switches.

In accordance with the principles of the present invention, a control circuit for use in an N-channel buck switching regulator monitors the bootstrap voltage of the switching regulator and provides a control signal to cause the driver circuits of the switching regulator to switch the power switches when the bootstrap voltage has decayed below a predetermined level. The switching action of the power switches refreshes the bootstrap voltage. In this manner, the switching regulator can maintain a duty cycle approaching 100% to avoid voltage dropout while maintaining the necessary bootstrap voltage for powering the high-side driver circuit driving the high-side power switch. In operation, depending on the current draw on the bootstrap voltage, the control circuit will allow the N-channel buck switching regulator to maintain a long on-time, skipping switching cycles until the bootstrap voltage decays to a sufficient level to require a recharge. A high duty cycle approaching 100% can thus be realized in an N-channel switching regulator.

By monitoring the bootstrap voltage and periodically refreshing the bootstrap voltage using short switching cycles to maintain the bootstrap voltage level, the bootstrap voltage control circuit of the present invention allows the switching regulator to run up to near 100% duty cycle. Such high duty cycle of operation is generally not possible and is often prohibited in conventional switch regulators. With a high duty cycle near 100%, the voltage headroom requirement between the input voltage and the output voltage of the switching regulator is eliminated and the regulator can operate even when the input voltage is very close to the output voltage.

According to the present invention, the bootstrap voltage control circuit monitors the bootstrap voltage to determine when the bootstrap voltage decays below a predetermined threshold. In one embodiment, the bootstrap voltage, or a scaled voltage of the bootstrap voltage, is compared to the switching output voltage to generate a control signal in the form of a control pulse. The control pulse signals the driver circuits to cause the power switches of the switching regulator to switch for a short time. In this manner, the control pulse initiates a short switch cycle to enable the bootstrap voltage to be charged back up to the desired level. As a result, the bootstrap voltage maintains the required voltage level for the high-side driver circuit to drive the high-side power switch to allow the N-channel high-side power switch to turn on completely without using a separate higher supply voltage The bootstrap voltage control circuit of the present invention is applicable in N-channel buck switching regulator topologies, including regulator topologies using internal or external power switches. In general, a "switching regulator" refers to a monolithic integrated circuit that includes integrated power switches, such as MOSFETs, to provide a switching output voltage directly from the integrated circuit. On the other hand, a "switching regulator controller" refers an integrated circuit coupled to discrete MOSFETs power switches external to the controller integrated circuit. The switching regulator controller provides drive signals for driving the external power switches to generate the switching output voltage. One of ordinary skill in the art would appreciate that the exact topology used in implementing the switching regulator is not critical to the practice of the present invention. In the present description, the term "switching regulator" is used to refer to a switching regulator device formed as a monolithic integrated circuit including internal power switches and a switch regulator device formed using a controller integrated circuit coupled to external, discrete power switches.

Figure 2:
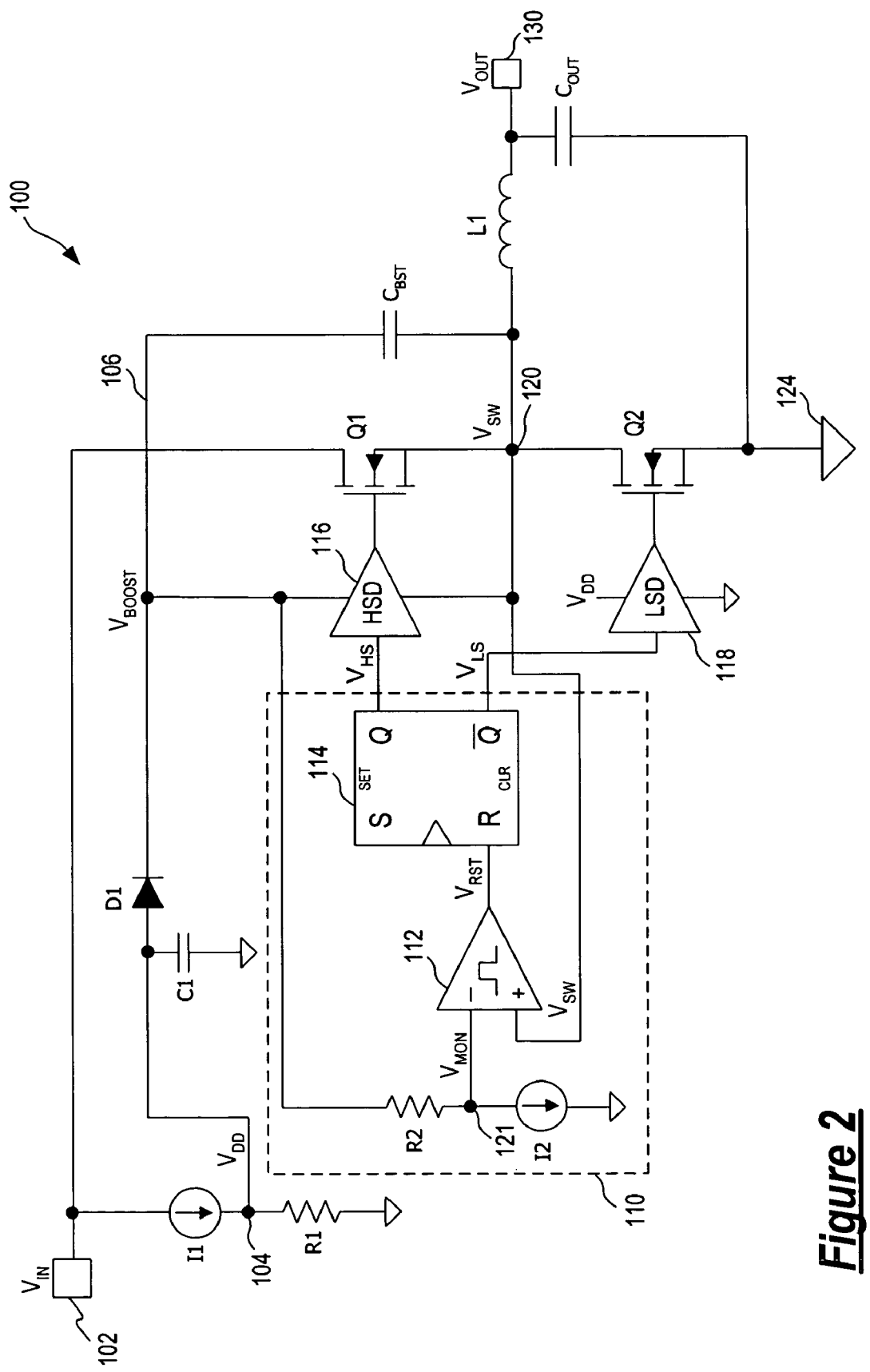
FIG. 2 is a circuit diagram of a control circuit for monitoring and maintaining the bootstrap voltage incorporated in an N-channel buck switching regulator according to one embodiment of the present invention.

FIG. 2 is a circuit diagram of a control circuit for monitoring and maintaining the bootstrap voltage incorporated in an N-channel buck switching regulator according to one embodiment of the present invention. In FIG. 2, the circuit diagram of the N-channel buck switching regulator 100 (or N-channel buck regulator 100) is simplified and only those circuit elements that are relevant and related to the bootstrap voltage control circuit of the present invention are included in the figure. One of ordinary skill in the art would appreciate that the N-channel buck regulator includes other circuit elements to complete the switching regulator circuit, as shown in the exemplary circuit diagram of FIG. 1. Furthermore, as described above, it is well known in the art that the power switches (Q1 and Q2 in FIGS. 1 and 2) can be integrated onto the same integrated circuit as the control circuitry of the switching regulator or the power switches can be off-chip components coupled to a switching regulator controller integrated circuit. The specific arrangement of the power switches relative to the switching regulator controller circuitry is not critical to the practice of the present invention.

Referring to FIG. 2, N-channel buck regulator 100 includes a high-side power switch Q1 and a low-side power switch Q2 connected in series between the input voltage $V_{IN}$ (at input node 102) and a ground voltage (at ground node 124). Power switches Q1 and Q2 are both N-channel MOSFETs. Power switches Q1 and Q2 are turned on alternately to generate a switching output voltage $V_{SW}$ at the switching output voltage node 120 between the two power switches. The switching output voltage $V_{SW}$ is coupled to an LC network including inductor L1 and capacitor $C_{OUT}$ to generate a regulated output voltage $V_{OUT}$ having a substantially constant magnitude.

High-side power switch Q1 and low-side power switch Q2 are driven by respective high-side driver circuit 116 and low-side driver circuit 118. High-side driver circuit 116 receives a drive control signal $V_{HS}$ and low-side driver circuit 118 receives a drive control signal $V_{LS}$ to cause the respective driver circuit to turn the respective power switch on or off. In the present illustration, drive control signals $V_{HS}$ and $V_{LS}$ are generated exclusively by bootstrap voltage control circuit 110 to simplify the discussion and to illustrate the operation of the bootstrap voltage control circuit of the present invention. However, as will be explained in more detail below, in actual implementations, bootstrap voltage control circuit 110 forms only a part of the control circuitry for the power switches and provides part of the control function of the power switches. Thus, in actual implementations, the output signals from bootstrap voltage control circuit 110 may be logically combined with other control signals to generate the final drive control signals for the driver circuits to drive power switches Q1 and Q2.

For example, buck regulator 100 typically includes a feedback control loop (not shown) formed by dividing down the output voltage $V_{OUT}$ (on node 130) to provide a feedback voltage $V_{FB}$ and feeding back the feedback voltage $V_{FB}$ to an error amplifier where the feedback voltage is compared to a reference voltage. The error voltage generated by error amplifier is indicative of the difference between the feedback voltage and the reference voltage and may be coupled to a PWM comparator. The PWM comparator compares the error voltage with a ramp voltage $V_{Ramp}$ to generate a PWM output voltage $V_{PWM}$ which output voltage forms a drive control signal to be coupled to the high-side and low-side driver circuits for driving the high-side switch Q1 and the low-side switch Q2. The feedback control loop operates to regulate the output voltage $V_{OUT}$ at a constant level over changing load conditions by varying the duty cycle of power switches Q1 and Q2. That is, the high-side switch Q1 and the low-side switch Q2 are turned on alternately to increase or decrease the inductor current through inductor L1. Thus, in this exemplary implementations, the drive control signal generated by the feedback control loop will be logically combined with the output signals from bootstrap voltage control circuit 110 of the present invention to provide the final drive control signals for the high-side and low-side driver circuits.

In a switching regulator, such as the PWM controlled switching regulator shown in FIG. 1 and described above, the output voltage $V_{OUT}$ of the switching regulator is regulated by controlling the duty cycle (or by varying the pulse width) of the rectangular switching output voltage $V_{SW}$ applied to the inductor L1 and the capacitor $C_{OUT}$ of the output filter circuit. The ratio of the output voltage $V_{OUT}$ to the input voltage $V_{IN}$ determines the duty cycle "D" of the switching regulator. When the input voltage $V_{IN}$ is very close to the output voltage $V_{OUT}$, a duty cycle of 100% or very near 100% is desired.

In the present description, "duty cycle D" of the buck regulator is defined as the percentage of time a power switch is turned on to cause the inductor current to increase. In general, if the load voltage $V_{OUT}$ is too low, the feedback control system increases the duty cycle so as to increase the amount of energy provided to the inductor. If the load voltage is too high, the feedback control system decreases the duty cycle so as to decrease the amount of energy provided to the inductor. In buck regulator 100, the duty cycle is also equivalent to the amount of time within a system clock cycle the high-side switch Q1 is turned on to increase the current in the inductor L. The duty cycle D of buck regulator 100 can be expressed as:

$$D = T_{ON}/T_{cycle},\qquad\text{Eq. (5)}$$

where $T_{ON}$ is the "on" time of high-side switch Q1 and $T_{cycle}$ is the system clock frequency or the system clock cycle time of the switching regulator. In normal operation, $T_{cycle}$ is equal to the sum of $T_{ON}$ and $T_{OFF}$ where $T_{OFF}$ is the time the high-side switch Q1 is turned off or the time the low-side switch Q2 is turned on. In a PWM controlled switching regulator operated in the continuous mode, the system clock frequency $T_{cycle}$ is set by the frequency of the PWM ramp voltage $V_{Ramp}$.

In buck regulator 100, high-side driver circuit 116 is supplied by a bootstrap voltage $V_{BOOST}$ and the switching output voltage $V_{SW}$ while low-side driver circuit 118 is supplied by a $V_{DD}$ voltage and the ground voltage. When both power switches Q1 and Q2 are N-channel MOSFET devices, bootstrap voltage $V_{BOOST}$ is used to supply the high-side driver circuit 116 to ensure that the driver circuit can turn on the high-side power switch Q1 completely without using a separate higher supply voltage.

Specifically, in operation, switching output voltage $V_{SW}$ switches between the input voltage $V_{IN}$ and the ground voltage. Therefore, low-side switch Q2 will have a drain voltage varying between the input voltage $V_{IN}$ and the ground voltage and a source voltage of the ground voltage. Thus, low-side driver circuit 118 can turn on switch Q2 as long as the driver circuit is biased by a $V_{DD}$ voltage larger than the threshold voltage of the N-channel MOSFET. On the other hand, high-side switch Q1 will have a drain voltage of the input voltage $V_{IN}$ and a source voltage varying between the input voltage and the ground voltage. Thus, high-side driver circuit 116 must provide a gate-to-source voltage greater than the input voltage $V_{IN}$ to ensure that switch Q1 can be turned on completely. Otherwise, when switch Q1 is turned on, the voltage $V_{SW}$ at the switch output node can only rise up to a voltage level of one threshold voltage drop below the input voltage $V_{IN}$.

The $V_{DD}$ voltage is an internal supply voltage derived from the input voltage $V_{IN}$ and generated internal to buck regulator 100 to provide power to the circuitry in the buck regulator. In FIG. 2, the $V_{DD}$ voltage is generated by a current source I1 coupled to input voltage node 102 and supplying current to a resistor R1. The $V_{DD}$ voltage is generated at a node 104 between current source I1 and resistor R1 and can have any fixed voltage value lower than the maximum allowable voltage value for the input voltage $V_{IN}$. A capacitor C1 is coupled to the $V_{DD}$ voltage node 104 to hold the $V_{DD}$ voltage value. In one embodiment, the $V_{DD}$ voltage is 5 volts for input voltages VIN greater than 5 volts.

In other embodiments, a low-dropout (LDO) regulator is used to generate the $V_{DD}$ voltage having a fixed value from the input voltage $V_{IN}$ having a voltage value greater than the fixed value. For the input voltage values that are less than the fixed value, the LDO regulator is in dropout and the $V_{DD}$ voltage may be established by shorting the $V_{DD}$ voltage to the input voltage VIN through a 10Ω resistor.

High-side driver circuit 116 is coupled to drive an N-channel MOSFET Q1 as the high-side switch. A bootstrap circuit including a capacitor $C_{BST}$ and a diode D1 is used to generate the bootstrap voltage $V_{BOOST}$ to supply high-side driver circuit 116. The bootstrap circuit supplies energy to high-side driver circuit 116 so that the driver circuit can drive high-side switch Q1 with a gate-to-source voltage greater than the input voltage $V_{IN}$ to ensure that switch Q1 can be completely turned on. Specifically, diode D1 has an anode terminal coupled to the $V_{DD}$ voltage node 104 and a cathode coupled to a bootstrap voltage node 106. Capacitor $C_{BST}$ is coupled between the bootstrap voltage node 106 and the switch output voltage node 120. The bootstrap voltage $V_{BOOST}$ is provided at the bootstrap voltage node 106.

The operation of the bootstrap circuit is as follows. Capacitor $C_{BST}$ is charged to the $V_{DD}$ voltage while low-side switch Q2 is on and the switching output voltage $V_{SW}$ is approximately 0 volt. In this condition, diode D1 is forward biased. Bootstrap voltage $V_{BOOST}$ is thus at the $V_{DD}$ voltage. When high-side driver circuit 116 receives a drive control signal for turning on the high-side switch Q1, voltage $V_{BOOST}$ stored on capacitor $C_{BST}$ is used to turn switch Q1 on. As switch Q1 turns on, the switching output voltage $V_{SW}$ increases to approximately the input voltage VIN. Diode D1 is then reversed biased and capacitor $C_{BST}$ floats high while the bootstrap voltage $V_{BOOST}$ continues to keep the switch Q1 turned on. In essence, with capacitor $C_{BST}$ precharged to the $V_{DD}$ voltage, when the switching output voltage $V_{SW}$ at the bottom plate of capacitor $C_{BST}$ increases to the input voltage $V_{IN}$, diode D1 becomes reversed biased and the bootstrap voltage $V_{BOOST}$ at the top plate of capacitor $C_{BST}$ increases to a value of $V_{IN}+V_{DD}$. High-side driver circuit 116 is thus provided with a bootstrap voltage $V_{BOOST}$ that is greater than the input voltage VIN for driving the high-side switch Q1 so as to turn on switch Q1 completely. When the low-side switch Q2 is turned back on, diode D1 becomes forward biased again and capacitor $C_{BST}$ is recharged through diode D1 to the $V_{DD}$ voltage.

By using the bootstrap circuit to generate bootstrap voltage $V_{BOOST}$ as described above, high-side driver circuit 116 is able to receive a supply voltage greater than the input voltage $V_{IN}$ to drive the N-channel high-side switch Q1. However, as described previously, even though capacitor $C_{BST}$ is charged up to the bootstrap voltage $V_{BOOST}$, leakage current will cause the precharged voltage at capacitor $C_{BST}$ to decrease so that periodic refreshing of the bootstrap voltage $V_{BOOST}$ is required. Refreshing or recharging of the bootstrap voltage $V_{BOOST}$ is accomplished by switching of the power switches Q1 and Q2. Specifically, Refreshing or recharging of the bootstrap voltage $V_{BOOST}$ is realized by turning off high-side power switch Q1 and turning on low-side power switch Q2. Thus, conventional N-channel buck regulators limits the duty cycle of the regulators to less than 100% to ensure that switching of the power switches occurs to recharge or refresh the bootstrap voltage $V_{BOOST}$.

In accordance with the present invention, a bootstrap voltage control circuit 110 is incorporated in buck regulator 100 to monitor the bootstrap voltage and to cause the bootstrap circuit to refresh the bootstrap voltage only when necessary. In this manner, buck regulator 100 can be operated at near 100% duty cycle when needed to generate the desired output voltage $V_{OUT}$. Switching of the power switches Q1 and Q2 occurs only when bootstrap voltage control circuit 110 determines that the bootstrap voltage $V_{BOOST}$ has decayed below a predetermined level. In that case, bootstrap voltage control circuit 110 provides a control signal in the form of a control pulse to cause a short switching cycle to occur at the power switches, thereby recharging the bootstrap voltage $V_{BOOST}$.

Referring to FIG. 2, bootstrap voltage control circuit 110 includes a one-shot comparator circuit 112 and a set-reset latch 114. Comparator circuit 112 receives a monitor voltage $V_{MON}$ on its inverting input terminal (node 121) as the first input signal. Monitor voltage $V_{MON}$ is a scaled down voltage of bootstrap voltage $V_{BOOST}$. In the present embodiment, a resistor R2 is coupled to receive the bootstrap voltage $V_{BOOST}$. Resistor R2 is biased by a current I2 to cause a voltage drop of R2*I2 across the resistor. The monitor voltage $V_{MON}$ at node 121 is thus the difference between the bootstrap voltage $V_{BOOST}$ and the voltage drop R2*I2 across the resistor R2. Comparator circuit 112 receives the switching output voltage $V_{SW}$ (node 120) on its non-inverting input terminal as the second input signal. In the present embodiment, the switching output voltage $V_{SW}$ is coupled directly to the non-inverting input terminal of comparator 112. In other embodiments, the switching output voltage $V_{SW}$ can be coupled to comparator 112 through a high frquency filter. For instance, a resistor/capacitor network can be used to form the high frequency filter. The resistor can be coupled between the switching output voltage node 120 and the non-inverting input terminal and the capacitor can be coupled between the non-inverting input terminal and the ground node.

The scaling of the bootstrap voltage $V_{BOOST}$ to generate the monitor voltage $V_{MON}$ is selected to establish a minimum bootstrap voltage $V_{BOOST\_MIN}$ greater than a voltage $V_{IN}+V_{TH\_HS}$ where $V_{TH\_HS}$ is the threshold voltage of high side switch Q1. Therefore, bootstrap voltage control circuit 110 ensures that the bootstrap voltage $V_{BOOST}$ remains greater than $V_{IN}+V_{TH\_HS}$ so that high-side driver circuit 116 can drive high-side switch Q1 properly. In the embodiment shown in FIG. 2, the scaling of the bootstrap voltage $V_{BOOST}$ is accomplished by resistor R2 biased by current source 12. It is understood that resistor R2 and current source 12 merely form a voltage feedback and divider circuit and it is possible to use other circuit configuration to realize the voltage feedback and divide function.

At one-shot comparator circuit 112, the monitor voltage $V_{MON}$ is compared to the switching output voltage $V_{SW}$. When the monitor voltage $V_{MON}$ is equal to or less than voltage $V_{SW}$, comparator circuit 112 generates a reset pulse as the output voltage signal $V_{RST}$. The reset pulse is of a short duration where the duration is sufficient to allow capacitor $C_{BST}$ to be recharged. The reset pulse is coupled to the reset terminal of set-reset latch 114. When latch 114 receives the reset pulse at the reset terminal, the non-inverting output terminal Q of latch 114 is caused to reset or switch to a logical low level while the inverting output terminal Q\ is caused to switch to a logical high level. The output signal from the non-inverting output terminal Q of latch 114 is the high-side drive control signal $V_{HS}$ for high-side drive circuit 116 while the output signal from the inverting output terminal Q\ of latch 114 is the low-side drive control signal $V_{LS}$ for low-side drive circuit 118. By toggling the high-side drive control signal $V_{HS}$ and the low-side drive control signal $V_{LS}$, power switches Q1 and Q2 are caused to switch in response to the reset pulse and the bootstrap voltage $V_{BOOST}$ is thereby refreshed. Because the reset pulse is of a short duration, the switching of power switches Q1 and Q2 is only of a short duration. When buck regulator is operated at 100% or near 100% duty cycle, the switching of the power switches caused by bootstrap voltage control circuit 110 is of such short duration that the overall duty cycle of buck regulator 100 does not deviate appreciably from the 100% or near 100% level.

After generating a reset pulse to refresh the bootstrap voltage $V_{BOOST}$, bootstrap voltage control circuit 110 returns to monitoring the bootstrap voltage to determine the next time the bootstrap voltage needs to be refreshed. In the present embodiment, comparator circuit 112 is a one-shot circuit to generate a one-shot pulse for initiating a short switching cycle at the power switches. Using of the one-shot pulse has the advantage that the power switches are only switched for a minimal time necessary to refresh or recharge the bootstrap voltage $V_{BOOST}$ and bootstrap voltage control circuit 110 returns control of the power switches to buck regulator 100 to regulate the duty cycle of the power switches to provide the desired output voltage $V_{OUT}$.

In the embodiment shown in FIG. 2, a set-reset latch is used to generate the drive control signals in response to reset pulse $V_{RST}$. However, the use of a set-reset latch is illustrative only and the logic circuitry for generating the drive control signals for the driver circuits is not critical to the practice of the present invention. Other logic circuitry can be used to generate the drive control signals in response to the reset pulse generated by the comparator circuit. In other embodiments, the one-shot comparator circuit can be coupled to the driver logic block in the switching regulator of FIG. 1 where the driver logic block is configured to trigger the high-side and low-side switching in response to the reset pulse and other control signals in the feedback control loop of the switch regulator.

Figure 3:
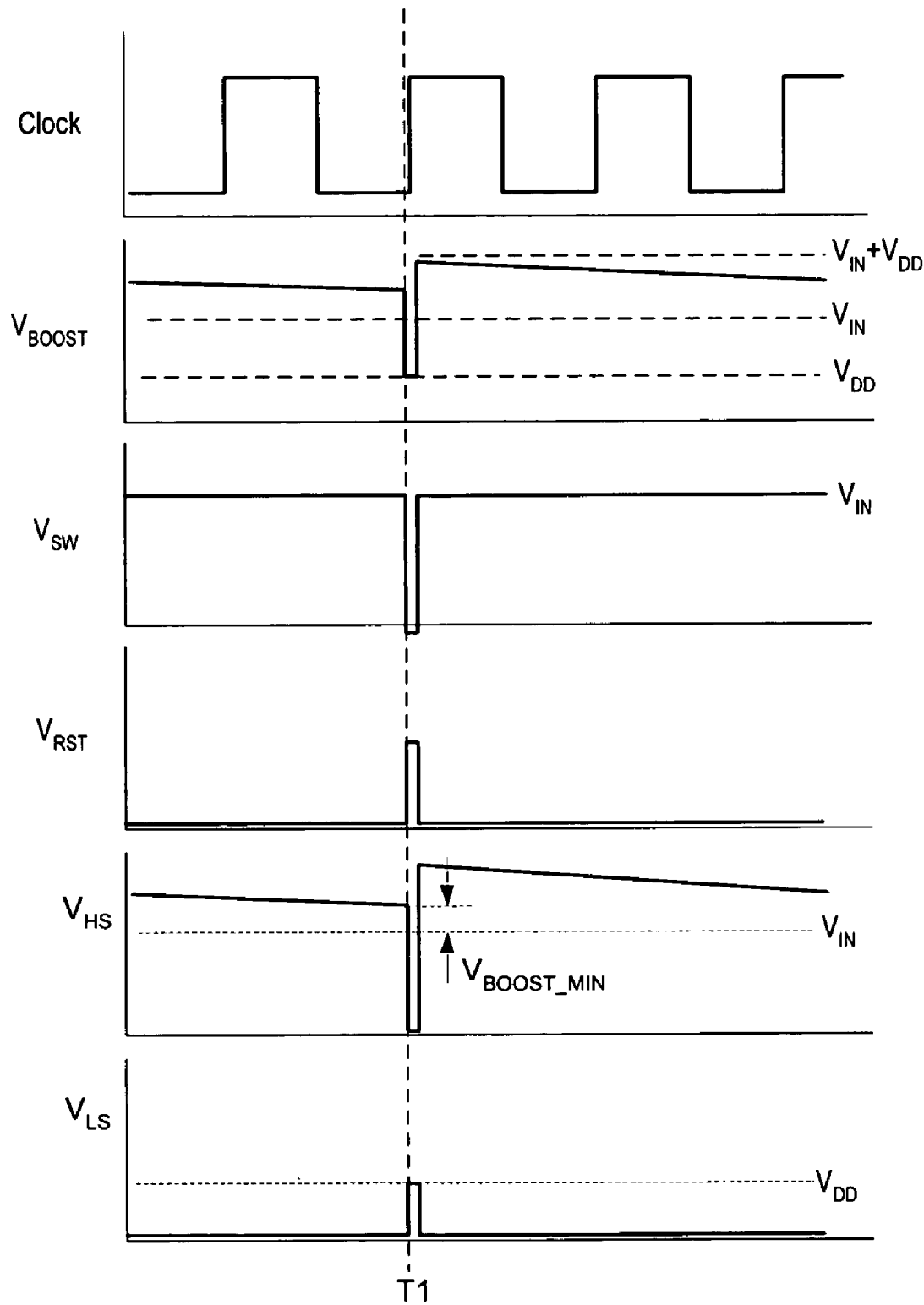
FIG. 3 includes voltage waveforms illustrating the operation of an N-channel buck switching regulator of FIG. 2 incorporating the control circuit for monitoring and maintaining the bootstrap voltage according to one embodiment of the present invention.

The operation of the bootstrap voltage control circuit of FIG. 2 is further described and illustrated by the signal waveforms of FIG. 3. FIG. 3 includes voltage waveforms illustrating the operation of the N-channel buck switching regulator of FIG. 2 incorporating the control circuit for monitoring and maintaining the bootstrap voltage according to one embodiment of the present invention. Referring to FIG. 3, buck regulator 100 is operated based on a system clock "Clock" having a given clock period. In the illustration of FIG. 3, it is assumed that buck regulator 100 is operating at 100% or near 100% duty cycle. Thus, during the initial cycle of the system clock, the high-side drive control signal $V_{HS}$ remains at a logical high while the low-side drive control signal $V_{LS}$ remains at a logical low. The high-side switch therefore remains turned on and the low-side switch remains turned off and the switching output voltage $V_{SW}$ remains at or near the input voltage $V_{IN}$. At this time, the bootstrap voltage $V_{BOOST}$ was previously recharged and remains above the minimum bootstrap voltage $V_{BOOST\_MIN}$ level of $V_{IN}+V_{TH\_HS}$.

Over time, due to leakage current, the bootstrap voltage $V_{BOOST}$ slowly decreases and the drive control signal $V_{HS}$ decreases correspondingly. At time T1, the bootstrap voltage $V_{BOOST}$ decreases to the minimum bootstrap voltage level. Bootstrap voltage control circuit 110 detects this voltage condition and generates a reset pulse at voltage $V_{RST}$. The reset pulse causes the high-side drive control signal to switch to a logical low and the low-side drive control signal to switch to a logical high for the duration of the reset pulse. The switching of the drive control signals results in switching of the power switches Q1 and Q2. High-side power switch Q1 is temporarily turned off while low-side power switch Q2 is temporarily turned on. The switching output voltage $V_{SW}$ therefore switches from input voltage $V_{IN}$ to 0 volt temporarily. In FIG. 3, the switching output voltage $V_{SW}$ is shown as dipping below the ground voltage. It is well known in the art that in a buck regulator, the switching output voltage $V_{SW}$ will dip below the ground voltage during continuous operation and the amount the switching output voltage will go below ground is determined by the peak inductor current and the drain-to-source on resistance of the low-side switch Q2.

When voltage $V_{SW}$ switches to 0 volt, capacitor $C_{BST}$ of the bootstrap circuit is recharged up to the $V_{DD}$ voltage. At the end of the recharge phase, buck regulator 100 returns to normal operation where buck regulator 100 is again operated at near 100% duty cycle. When the switching output voltage $V_{SW}$ switches to the input voltage $V_{IN}$, the bootstrap voltage $V_{BOOST}$ increases to a value of $V_{IN}+V_{DD}$ as capacitor $C_{BST}$ is now recharged to voltage level of the $V_{DD}$ voltage. As shown in FIG. 3, the bootstrap voltage $V_{BOOST}$ may continue to decrease after the recharge due to leakage current. Bootstrap voltage control circuit 110 will operate to recharge bootstrap voltage $V_{BOOST}$ when the bootstrap voltage has decreased below the minimal allowable level of $V_{IN}+V_{TH\_HS}$.

As shown in FIG. 3, buck regulator 100 can operate at a duty cycle very near 100% to avoid output voltage dropout in situations where the input voltage is very close to the output voltage. The duty cycle is not exactly 100% because the power switches are switched occasionally to refresh or recharge the bootstrap voltage. However, by using the control circuit and control scheme of the present invention, the bootstrap voltage is monitored and refreshed only when needed. Therefore, the switching of the power switches is reduced to a minimal level necessary to maintain the bootstrap voltage and the switching regulator can operate at a duty cycle very close to 100%.

As described above, the circuit diagram of FIG. 2 is illustrative only and does not include other circuit elements for completing the switching regulator. In actual implementations, the bootstrap voltage control circuit of the present invention is incorporated in a buck switching regulator, such as that shown in FIG. 1, to provide at least part of the control of the high-side driver circuit and the low-side driver circuit. For instance, in FIG. 2, the high-side driver circuit and the low-side driver circuit are shown as being controlled exclusively by the output signals of the bootstrap voltage control circuit. This is illustrative only and one of ordinary skill in the art would appreciate that in actual implementations, the high-side driver circuit and the low-side driver circuit are controlled by other control signals generated based on other operating conditions of the buck regulator. In one embodiment, the bootstrap voltage control circuit of the present invention is incorporated in the "Driver Logic" circuit block of the N-channel buck regulator of FIG. 1 where the Driver Logic circuit block generates output signals for controlling the high-side driver circuit and the low-side driver circuit. The Driver Logic circuit block combines the drive control signals generated by the bootstrap voltage control circuit with control signals generated by other circuitry in the buck regulator to provide the final control signals for controlling the high-side driver circuit and the low-side driver circuit.

The above detailed descriptions are provided to illustrate specific embodiments of the present invention and are not intended to be limiting. Numerous modifications and variations within the scope of the present invention are possible. For example, in the embodiment shown in FIG. 2, comparator circuit 112 is a one shot circuit generating a pulse of a short duration compared to the system cycle time whenever a comparison result of the monitor voltage being less than the switching output voltage $V_{SW}$ is detected. However, in other embodiments, other comparator circuits can be used to implement comparator circuit 112. The present invention is defined by the appended claims.

I claim:

1. A control circuit in a switching regulator receiving an input voltage and providing a regulated output voltage having a substantially constant magnitude, the switching regulator including a high-side power switch and a low-side power switch connected in series between the input voltage and a first power supply voltage, the high-side power switch and the low side power switch being turned on alternately to generate a switching output voltage at a common node between the power switches which switching output voltage is used to generate the regulated output voltage, the high-side power switch being driven by a high-side driver circuit and the low-side power switch being driven by a low-side driver circuit where the high-side driver circuit is supplied by a bootstrap voltage and the switching output voltage, the control circuit comprising:

a voltage feedback and divider circuit coupled to receive the bootstrap voltage and divide the bootstrap voltage to generate a monitor voltage;

a comparator circuit having a first input terminal coupled to receive the monitor voltage and a second input terminal coupled to receive a voltage indicative of the switching output voltage, the comparator circuit generating an output signal at an output terminal, the output signal having a first state when the monitor voltage is equal to or less than the voltage indicative of the switching output voltage; and a logic circuit coupled to receive the output signal of the comparator circuit and generate a high-side drive control signal to the high-side driver circuit and a low-side drive control signal to the low-side driver circuit, wherein the logic circuit generates the high-side and low-side drive control signals in response to the output signal of the comparator circuit having the first state to cause the high-side power switch to turn off and the low-side power switch to turn on, thereby recharging the bootstrap voltage to a first voltage.

2. The control circuit of claim 1, wherein the voltage feedback and divider circuit comprises a resistor coupled between the bootstrap voltage and the first input terminal of the comparator circuit and a first current source having a first current value coupled between the first input terminal of the comparator circuit and the first power supply voltage.

3. The control circuit of claim 1, wherein the switching output voltage is directly coupled to the second input terminal of the comparator circuit.

4. The control circuit of claim 1, wherein the first input terminal of the comparator circuit comprises an inverting input terminal and the second input terminal of the comparator circuit comprises a non-inverting input terminal.

5. The control circuit of claim 1, wherein the comparator circuit comprises a one-shot comparator circuit, the one-shot comparator circuit generating a control pulse having the first state for a short duration as the output signal when the monitor voltage is equal to or less than the voltage indicative of the switching output voltage, the control pulse having a duration comprising a small portion of a system cycle time of the switching regulator.

6. The control circuit of claim 1, wherein the logic circuit comprises a set-reset latch, the set-reset latch having a reset input terminal coupled to receive the output signal of the comparator circuit, a non-inverting output terminal providing the high-side drive control signal and an inverting output terminal providing the low-side drive control signal.

7. The control circuits of claim 1, wherein the high-side and low-side power switches comprise N-channel MOSFETs.

8. The control circuit of claim 7, wherein when the bootstrap voltage decreases to a minimum bootstrap voltage value equal to or less than the sum of the input voltage and the threshold voltage of the N-channel MOSFET, the monitor voltage is equal to or less than the voltage indicative of the switching output voltage.

9. The control circuit of claim 1, wherein the first power supply voltage is the ground voltage.

10. A method in a switching regulator receiving an input voltage and providing a regulated output voltage having a substantially constant magnitude, the switching regulator including a high-side power switch and a low-side power switch connected in series between the input voltage and a first power supply voltage, the high-side power switch and the low side power switch being turned on alternately to generate a switching output voltage at a common node between the power switches which switching output voltage being used to generate the regulated output voltage, the high-side power switch being driven by a high-side driver circuit and the low-side power switch being driven by a low-side driver circuit where the high-side driver circuit is supplied by a bootstrap voltage and the switching output voltage, the method comprising:

measuring the bootstrap voltage;

generating a monitor voltage indicative of the bootstrap voltage;

comparing the monitor voltage to a voltage indicative of the switching output voltage;

generating a first signal having a first state when the monitor voltage is equal to or less than the voltage indicative of the switching output voltage;

turning off the high-side power switch in response to the first signal having the first state; and turning on the low-side power switch in response to the first signal having the first state, thereby recharging the bootstrap voltage.

11. The method of claim 10, wherein generating a first signal having a first state when the monitor voltage is equal to or less than the voltage indicative of the switching output voltage comprises:

generating a pulse having the first state when the monitor voltage is equal to or less than the voltage indicative of the switching output voltage, the pulse having a duration comprising a small portion of a system cycle time of the switching regulator.

12. The method of claim 10, wherein the high-side and low-side power switches comprise N-channel MOSFETs.

13. The method of claim 12, wherein when the bootstrap voltage decreases to a minimum bootstrap voltage value equal to or less than the sum of the input voltage and the threshold voltage of the N-channel MOSFET, the monitor voltage is equal to or less than the voltage indicative of the switching output voltage.

14. The method of claim 10, wherein comparing the monitor voltage to a voltage indicative of the switching output voltage comprises:

comparing the monitor voltage to the switching output voltage.

* * * * *